(12) United States Patent
Stiller

(10) Patent No.: US 7,765,065 B2
(45) Date of Patent: Jul. 27, 2010

(54) METHOD AND DEVICE FOR INFLUENCING AT LEAST ONE PARAMETER ON A VEHICLE

(75) Inventor: Christoph Stiller, Ehlingen (DE)

(73) Assignee: Robert Bosch GmbH, Stuttgart (DE)

( * ) Notice: Subject to any disclaimer, the term of this patent is extended or adjusted under 35 U.S.C. 154(b) by 898 days.

(21) Appl. No.: 10/362,989

(22) PCT Filed: Mar. 16, 2002

(86) PCT No.: PCT/DE02/00963

§ 371 (c)(1),
(2), (4) Date: Jul. 30, 2003

(87) PCT Pub. No.: WO03/002366

PCT Pub. Date: Jan. 9, 2003

(65) Prior Publication Data

US 2004/0006427 A1 Jan. 8, 2004

(30) Foreign Application Priority Data

Jun. 28, 2001 (DE) .................................. 101 31 198

(51) Int. Cl.
*G06F 19/00* (2006.01)
(52) U.S. Cl. .................. 701/301; 701/45; 345/435; 342/70
(58) Field of Classification Search ............. 701/301, 701/1, 45; 280/728.1, 733, 806, 735; 342/70, 342/72; 340/435, 436, 903; 700/304; 324/662
See application file for complete search history.

(56) References Cited

U.S. PATENT DOCUMENTS 5,314,037 A 5/1994 Shaw et al.
5,528,698 A 6/1996 Kamei et al.

(Continued)

FOREIGN PATENT DOCUMENTS

EP   1034984 A2 * 12/1999

(Continued)

OTHER PUBLICATIONS

U. Franke at al., "Real-time Stereo Vision for Urban Traffic Scene Understanding", Proceedings of the IEEE Intelligent Vehicles Symposium 2000 (Cat No. 00TH8511), Proceedings of IV 2000 Intelligent Vehchiles Symposium, Dearborn, MI, USA, Oct. 3-5, 200, pp. 273-278.

(Continued)

*Primary Examiner*—Ronnie Mancho
(74) *Attorney, Agent, or Firm*—Kenyon & Kenyon LLP

(57) ABSTRACT

Method and device for manipulating at least one parameter of a vehicle and used to improve active and passive occupant safety. The vicinity of a vehicle being monitored for the occurrence of at least one relevant event. A vehicle interior being monitored for the actual position of at least one person (vehicle occupant). Signals corresponding to the event or the actual position being supplied to an evaluation unit upon the occurrence of the at least one relevant event and/or on detecting the actual position. The evaluation unit activating at least one active and/or passive safety system of the vehicle as a function of the at least one detected relevant event and the detected actual position of the at least one person.

19 Claims, 1 Drawing Sheet

U.S. PATENT DOCUMENTS

| | | | | |
|---|---|---|---|---|
| 5,983,147 A | * | 11/1999 | Krumm | 701/45 |
| 5,983,161 A | * | 11/1999 | Lemelson et al. | 701/301 |
| 6,085,151 A | * | 7/2000 | Farmer et al. | 701/301 |
| 6,198,998 B1 | | 3/2001 | Farmer et al. | |
| 6,459,974 B1 | * | 10/2002 | Baloch et al. | 701/45 |
| 6,693,440 B2 | * | 2/2004 | Basir et al. | 324/662 |
| 6,801,662 B1 | * | 10/2004 | Owechko et al. | 382/224 |
| 6,834,116 B2 | * | 12/2004 | Ertl et al. | 382/103 |
| 6,910,711 B1 | * | 6/2005 | Breed et al. | 280/735 |
| 2003/0009270 A1 | * | 1/2003 | Breed | 701/29 |

FOREIGN PATENT DOCUMENTS

EP    1 034 984    9/2000

OTHER PUBLICATIONS

Bertozzi et al., "A Real Time Oriented System for Vehicle Detection", Journal of Systems Architecture, vol. 43, No. 1/5, Mar. 1, 1997, pp. 317-325.

* cited by examiner

METHOD AND DEVICE FOR INFLUENCING AT LEAST ONE PARAMETER ON A VEHICLE

RELATED APPLICATION INFORMATION

This application claims priority to, and the benefit of, German Patent Application No. 101 31 198.2, which was filed in Germany on Jun. 28, 2001.

FIELD OF THE INVENTION

The present invention relates to a method and a device for manipulating at least one parameter of a vehicle.

BACKGROUND INFORMATION

A method of monitoring the vicinity of a vehicle, using a video recording unit that includes a stereo camera for recording three-dimensional images, is discussed in the publication IEEE Intelligent Vehicles Symposium, October 2000, "Real-Time Stereo Vision for Urban Traffic Scene Understanding", U. Franke. Evaluating the recorded traffic scene, may allow determination of the position, for example, of additional vehicles, people, or objects in the vicinity of the vehicle. Based on this information, a controller may be used to manipulate the vehicle's longitudinal and/or transverse control, supporting the driver in driving the vehicle and improving driving comfort and traffic safety. If a collision is imminent, for example, an automatic avoidance or braking maneuver may avoid the collision or at least reduce the collision energy.

A method of monitoring the vicinity of a vehicle, using a radar unit, a lidar unit or using ultrasound sensors, is also referred to in other systems. The use of a high-precision satellite positioning system (DGPS/INS) has also been discussed to monitor the vicinity of a vehicle.

The use of a video sensor system, in particular, a stereo camera, to monitor the scene of a passenger seat in a motor vehicle, is discussed in U.S. Pat. No. 5,983,147. Evaluation of the recorded scene helps determine whether the passenger seat is occupied. Establishing that the passenger seat is occupied, may allow for determination of whether it is occupied by a large person (adult) or a small person (child) or a different object. Based on the information thus obtained, the deployment of a passenger air bag may be influenced. The deployment of an air bag may present considerable risk of injury, particular to small people due to their relatively close proximity to the air bag as the air bag inflates. The method discussed in U.S. Pat. No. 5,983,147 may be used to decide whether to prevent the deployment of the passenger air bag or to cause it to be only partially deployed in the event of an accident, by detecting a head/chest area of a passenger in the air bag inflation region.

Methods of influencing active vehicle safety systems, for example, steering, brake, gas, and similar systems, by monitoring the vicinity of a vehicle, as well as methods of influencing passive safety systems, for example, air bags, seatbelt tighteners and similar systems, by monitoring the vehicle interior, are therefore referred to in other systems. Undesirable interactions occur between these active and passive safety functions. For example, active braking prior to an imminent collision may propel the occupants of the vehicle forward, due to mass inertia, which may place the head/chest area of the vehicle occupants in the air bag inflation region. In extreme situations, this may even increase the danger to the vehicle occupants caused by the active braking maneuver.

SUMMARY OF THE INVENTION

It is an object of the present invention to provide a method and a device according for increasing the active and passive safety of vehicle occupants.

This object may be achieved by a method according to the present invention. By monitoring the vicinity of a vehicle for the occurrence of at least one relevant event, monitoring the interior of a vehicle for the actual position of at least one person, supplying signals corresponding to the event or the actual position to an evaluation unit upon the occurrence of the at least one relevant event and on detecting the actual position, and having the evaluation unit activate at least one active and/or passive safety system of the vehicle as a function of the at least one detected relevant event and the detected actual position of the at least one person, it may be possible to combine the initiation of active and passive safety functions. In particular, this prevents a distinction being made between active and passive safety functions, but instead achieves vehicle occupant safety by a coordinated intervention into active and passive safety systems. The ability of active and passive safety functions to influence each other is thereby made predictable and thus manageable, while also allowing them to be used selectively.

The object may further achieved by a device according to the present invention. The fact that the device includes at least one unit for monitoring the vicinity of a vehicle, at least one unit for monitoring the interior of a vehicle, and an evaluation unit for evaluating signals supplied by the monitoring units and corresponding to the occurrence of a relevant event in the vicinity of the vehicle and the actual position of at least one person in the vehicle interior, the evaluation unit including an arrangement for the coordinated control of at least one active and/or passive safety system as a function of the monitoring signals, may allow interconnection of vehicle components of other systems and that are regularly present in modern vehicles so that coordinated, automatic activation of active and passive safety elements at minimum cost may be allowed. This may ensure occupant safety, in particular, as a function of a relevant event that has occurred in the vicinity of the vehicle, while simultaneously taking into account an actual position of a person inside the vehicle.

DETAILED DESCRIPTION

Figure 1:
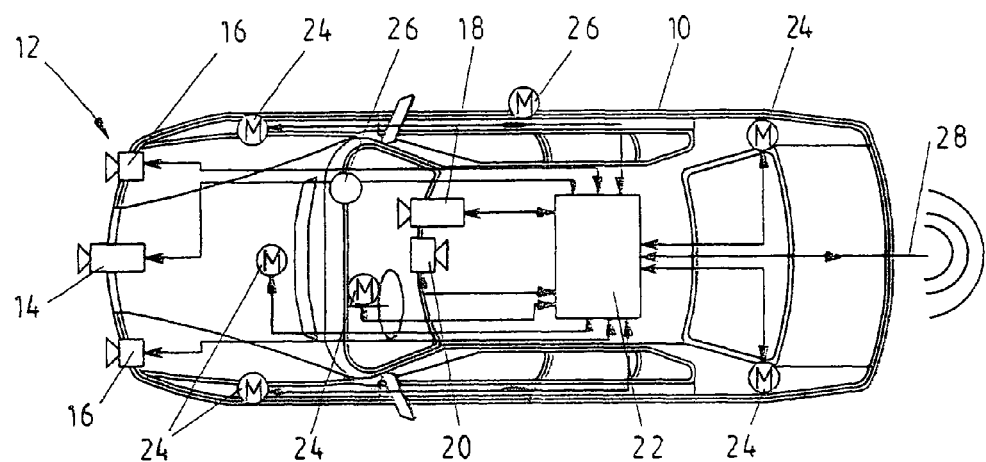
FIG. 1 shows a schematic top view of a vehicle.

FIG. 1 shows a schematic top view of a motor vehicle 10, which includes a device, identified as a whole by reference number 100, for manipulating at least one parameter of motor vehicle 10. Device 100 includes a unit, identified as a whole by reference number 12, for monitoring the vicinity of the vehicle. One component of unit 12 is, for example, a long-range radar sensor 14 positioned largely on the vehicle's longitudinal axis, short-range radar sensors 16 positioned in the left or right front side area, and an image detection unit 18 that may be positioned in the roof area and is configured, for example, as a stereo-video sensor. Unit 12 and its sensors 14, 16 and 18 are configured in a manner that is referred to in other systems for monitoring the vicinity of a vehicle to detect the presence of additional vehicles, people, and/or objects.

Device 100 also includes a unit 20 that is configured, for example, as an image detection unit, in particular as a video-video sensor. Unit 20 may be used to monitor the interior of a vehicle in a manner referred to in other systems and to detect the actual position of people sitting, for example, in a driver's seat, a passenger seat, and/or a back seat.

The individual components of units 12 and 20 are connected to an evaluation unit 22 which includes processors, memory elements and similar components which are not illustrated individually. Unit 12 supplies monitoring signals of the vehicle vicinity to evaluation unit 22, a corresponding event signal being generated by evaluation unit 22 upon the occurrence of a relevant event in the vicinity of the vehicle, for example, the detection of a vehicle, a person, and/or an object.

At the same time, the signals supplied by unit 20 are monitored by evaluation unit 22 and, if an actual position of at least one person inside the motor vehicle is detected, a position signal corresponding to this actual position is generated.

The event signals and the position signals are combined in evaluation unit 22 in a manner to be described below.

Evaluation unit 22 is additionally connected to actuators 24, for example electric, hydraulic and/or pneumatic actuators, which may be used to control a drive, a brake, or a steering system. Actuators 24 are thus suitable for influencing active safety systems of motor vehicle 10. Evaluation unit 22 is also connected to actuators 26, which may be used to activate passive safety systems of motor vehicle 10, for example air bag modules, seatbelt tighteners, and similar devices.

Evaluation unit 22 is also connected to a communications unit 28, which may allow motor vehicle 10 to communicate with additional motor vehicles and/or a higher-level central station.

The illustration in FIG. 1 is merely schematic and is not complete. Thus, unit 12 as well as unit 20 may include additional components that are suitable for monitoring the vicinity of the vehicle or the vehicle interior. In particular, individual components are integratable into an assembly. For example, image detection unit 18 and the image detection unit of unit 20 and evaluation unit 22 are integratable into a common module that is located, for example, in the roof area of motor vehicle 10.

Figure 2:
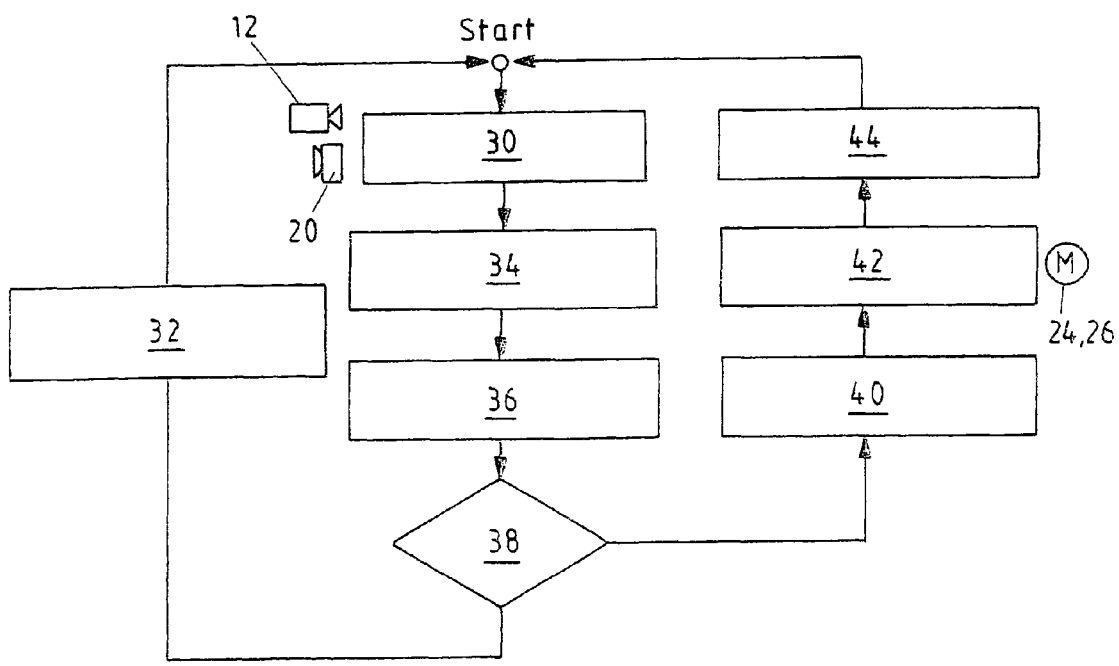
FIG. 2 shows a flowchart of the method according to the present invention.

The method according to the present invention of manipulating at least one parameter of motor vehicle 20 is described on the basis of FIG. 2.

After the method is initiated, which may be done, for example, by activating a drive engine of motor vehicle 10, the monitoring signals of unit 12 for monitoring the vicinity of the vehicle and the position signals of unit 20 for monitoring the vehicle interior are detected in a first step 30. The components of units 12 and 20 are activated by evaluation unit 22, so that the events that are classified as especially relevant, based on the detected signals from evaluation unit 22, may be selectively tracked. In addition, the events detected by one of the components of units 12 and/or 20 are thus verifiable by comparing them with the signals of a further component of same unit 12 and/or 20.

Furthermore, in step 30, evaluation unit 22 may be simultaneously provided with the status of additional vehicles located in the vicinity of motor vehicle 10 as information 32 via communications unit 28. Evaluation unit 22 thus has information related to the presence of vehicles, people, and/or objects in the vicinity of the vehicle, the actual position of vehicle occupants and, if necessary, the status of other vehicles located in the vicinity of the vehicle.

In a next step 34, the kinematics of the vehicles, people, and/or objects located in the vicinity of vehicle 10, as well as the vehicle occupants, are predicted on the basis of this information, taking into account the planned movement of motor vehicle 10 itself. For example, Kalman filters including kinematic system equations may be used for this purpose. Information 32, which relates to the trajectories of additional vehicles, may be added to these kinematic system equations.

In a next step 36, the kinematics of local motor vehicle 10 as well as the vehicle occupants, as well as the kinematics of additional vehicles 10 in the vicinity of the vehicle, are evaluated to determine the present actual safety situation. An evaluation criterion, for example, is the time-to-contact, derived from existing information, between all vehicles, people, and/or objects in the vicinity of motor vehicle 10 and vehicle 10 itself. This time-to-contact defines the amount of time that passes until the predicted trajectory of a motor vehicle, person, and/or object in the vicinity of motor vehicle 10 intersects with that of motor vehicle 10. The time of collision with a vehicle, person, and/or object in the vicinity of motor vehicle 10 may thus be determined on the basis of the present kinematics of the other vehicle, person, and/or object. If this time-to-contact drops below a selectable threshold value, a decision 38 is made as to whether at least one parameter of motor vehicle 10 should be manipulated to optimize occupant safety. If it is determined on the basis of decision 38 that occupant safety is ensured, no intervention is made, and the local vehicle parameters are communicated to additional interested vehicles via communications unit 28. If decision 28 ("safety without intervention?") shows that at least one parameter of motor vehicle 10 must be manipulated, the information is communicated, again via communications unit 28, to nearby interested vehicles in the form of the local vehicle's predicted trajectory. These vehicles are then able to estimate their own safety (provided that corresponding equipment has been installed) according to the method they use to manipulate at least one vehicle parameter and take appropriate countermeasures, namely manipulate at least one vehicle parameter.

If the time-to-contact value drops below the selected threshold value, step 40 is additionally activated by determining how and which parameters of motor vehicle 10 are manipulatable to optimize vehicle occupant safety on the basis of the present situation. Manipulating at least one parameter of motor vehicle 10 causes motor vehicle 10 to execute a driving maneuver with the goal of avoiding a collision with a vehicle, person, and/or object in the vicinity of motor vehicle 10, or to minimize the collision energy, simultaneously taking into account the risk of injury to the vehicle occupants by passive safety devices (air bags, seatbelt tighteners, and similar devices).

The following, for example, may be selected as physical driving maneuvers:

- Full braking of all wheels using maximum braking pressures, while maintaining the present steering angle;
- Full braking of all wheels using maximum braking pressure and steering straight ahead;
- Maximum steering angle to the left so that the achievable transverse acceleration is not exceeded, while allowing the wheels to rotate freely;
- Maximum steering angle to the right so that the achievable transverse acceleration is not exceeded, while allowing the wheels to rotate freely;
- Minimum steering angle to the right or left, avoiding contact with an object in serious danger of collision, at the same time applying maximum braking pressure;
- Continuation of the present position of the brakes and the maneuver last planned.

This list is in not complete and may, of course, include other suitable physical driving maneuvers.

On the basis of the criteria described above, the trajectories of vehicles, people, and/or objects in the vicinity of the vehicle and the trajectories of vehicle occupants inside vehicle 10 are predicted for each of the physical driving maneuvers from the perspective of optimizing vehicle safety. In the event that one of the maneuvers results in a predicted forward movement of an occupant, for example, into the air bag inflation region, the corresponding maneuver is supplemented by activating the passive safety systems (seatbelt tightener or similar device) and then recalculated. If the vehicle occupant has already been propelled forward (determined by device 20 by checking the actual position), the time remaining until the air bag is optimally deployed is calculated. If this time lies below a deployment threshold, the corresponding maneuver is supplemented by activating the air bag. Taking the actual position of the vehicle occupant into account, it may also be allowed to partially activate or to deactivate the air bag, thereby minimizing the risk of vehicle passengers being injured by an inflating air bag. If necessary, the deactivation or partial activation of the air bag is adjusted using a predicted collision direction and/or collision energy of motor vehicle 10. In any case, the goal is to optimize occupant safety of motor vehicle 10 by coordinating the activation or deployment of the available active and passive safety systems in motor vehicle 10.

In a subsequent step 42, the driving maneuver in which injury to the vehicle occupants is likely to be minimum is selected from the previously determined driving maneuvers. Methods are generally referred to in other systems for calculating the seriousness of injury from the trajectories of the people or objects involved. For example, the expected seriousness of injury due to the maximum acceleration achievable by a vehicle occupant during a period of 3 ms is used. If it is determined that a collision-free driving maneuver may not be avoided, the driving maneuver expected to cause the least injury to the vehicle occupants is selected. Depending on this selection, control commands are issued to actuators 24 and/or 26 in step 42.

An emergency call (via communications unit 28) may be placed along with the initiation of a driving maneuver having the least possible risk of injury, and/or an occupant warning system is activated (for example, acoustically and/or visually).

In step 44, the selected driving maneuver and the resulting trajectory are simultaneously looped back to the step so that the method for manipulating at least one parameter of motor vehicle 10 is performed in cycles. At the same time, the selected driving maneuver may be communicated via communications unit 28 to additional vehicles located in the vicinity of motor vehicle 10 and/or to a higher-level central station for notification purposes.

The cyclical situation monitoring process and the resulting selection of a driving maneuver for optimum vehicle occupant safety may allow for continuously checking the initiated maneuver and to adapt it to the actual situation, and possibly adjust it, on the basis of changing conditions, in particular, the now modified trajectory of motor vehicle 10 and the relationship between this trajectory and nearby vehicles, people, and/or objects detected in the vicinity or vehicle occupants inside the vehicle.

What is claimed is:

1. A method of manipulating at least one parameter of a vehicle to optimize vehicle occupant safety, the method comprising:

monitoring a vicinity of the vehicle for occurrence of at least one relevant event, wherein the at least one relevant event includes detection of at least one of another vehicle, a person outside the vehicle and an object in the vicinity of the vehicle;

monitoring a vehicle interior for an actual position of at least one person inside the vehicle;

supplying signals corresponding to one of the at least one relevant event and the actual position to an evaluation unit upon occurrence of the at least one relevant event and on detecting the actual position; and activating, based on an evaluation output of the evaluation unit, an active safety system and a passive safety system of the vehicle as a function of the at least one relevant event and the actual position;

wherein kinematics of the at least one of another vehicle, the person outside the vehicle, and the object detected in the vicinity of the vehicle is predicted and kinematics of the at least one person inside the vehicle is predicted, and wherein the predicted kinematics of the at least one of another vehicle, the person outside the vehicle and the object in the vicinity of the vehicle and the predicted kinematics of the at least one person inside the vehicle are considered by the evaluation unit in generating the evaluation output.

2. The method of claim 1, wherein the evaluation unit controls at least one component of at least one monitoring system to detect the at least one relevant event and the actual position.

3. The method of claim 1, wherein the evaluation unit combines the signals corresponding to the at least one relevant event and the actual position.

4. The method of claim 3, wherein additional vehicles located in the vicinity of the vehicle are taken into account in addition to a vehicle status.

5. The method of claim 1, wherein the predicted kinematics of the at least one of another vehicle, the person outside the vehicle and the object in the vicinity of the vehicle and the predicted kinematics of the at least one person inside the vehicle are evaluated with a view to a present actual safety situation.

6. The method of claim 5, wherein a time-to-contact is used as an evaluation criterion.

7. The method of claim 1, wherein the at least one parameter is determined when an actual safety situation drops below a selectable threshold value for a purpose of executing a physical driving maneuver of the vehicle.

8. The method of claim 7, wherein a first trajectory of at least one of other vehicles, people, and objects in the vicinity of the vehicle, a second trajectory of vehicle, and a third trajectory of the at least one person are predicted for the physical driving maneuver.

9. The method of claim 7, wherein the physical driving maneuver is configured to minimize injury to the at least one person.

10. The method of claim 9, wherein a trajectory of the physical driving maneuver is taken into account when evaluating the actual current safety situation.

11. The method of claim 9, wherein at least one of an emergency call and a passenger warning system is activated upon execution of the physical driving maneuver.

12. The method of claim 1, wherein at least one of a brake, a steering system, an acceleration, an air bag, and a seatbelt tightener is manipulated as the at least one parameter.

13. A device for manipulating at least one parameter of a vehicle to optimize vehicle occupant safety, the device comprising:

a first unit for monitoring a vicinity of the vehicle;
a second unit for monitoring a vehicle interior;

monitoring units to supply signals that correspond to an occurrence of a relevant event in the vicinity of the vehicle and an actual position of at least one person inside the vehicle, wherein the relevant event includes detection of at least one of another vehicle, a person outside the vehicle and an object in the vicinity of the vehicle;

an evaluation unit to evaluate the signals supplied by the monitoring units, wherein kinematics of the at least one of another vehicle, the person outside the vehicle, and the object detected in the vicinity of the vehicle is predicted and kinematics of the at least one person inside the vehicle is predicted; and an arrangement to control an active safety system and a passive safety system as a function of the signals, the arrangement being arranged in the evaluation unit, wherein the predicted kinematics of the at least one of another vehicle, the person outside the vehicle and the object in the vicinity of the vehicle and the predicted kinematics of the at least one person inside the vehicle are considered by the arrangement in controlling the active safety system and the passive safety system.

14. The device of claim 13, wherein the first unit includes at least one of a long-range radar sensor, a short-range radar sensor and an image detection unit.

15. The device of claim 14, wherein the image detection unit includes a stereo video sensor.

16. The device of claim 13, wherein the second unit includes an image detection unit.

17. The device of claim 16, wherein the image detection unit includes a stereo video sensor.

18. The device of claim 13, wherein at least individual components of the first unit, the second unit, and the evaluation unit are integrated to form an assembly.

19. The device of claim 13, wherein the evaluation unit is connected to at least one actuator for one of activating and influencing at least one of an active safety system and passive safety system of the vehicle.

* * * * *